United States Patent [19]

Chapline et al.

[11] Patent Number: 4,750,773
[45] Date of Patent: Jun. 14, 1988

[54] FOLDAWAY BOX OR CABINET

[76] Inventors: C. B. Chapline, P.O. Box 361, Mina, Nev. 89422; George Spector, 233 Broadway, Rm. 3815, New York, N.Y. 10007

[21] Appl. No.: 51,280

[22] Filed: May 18, 1987

[51] Int. Cl.⁴ .............................................. B60R 9/06
[52] U.S. Cl. .................................. 296/37.6; 296/37.5
[58] Field of Search ................... 296/37.6, 37.16, 37.5, 296/37.1; 312/290, DIG. 33; 224/273, 42.42, 310

[56] References Cited

U.S. PATENT DOCUMENTS

| 1,179,445 | 4/1916 | Manning | 296/37.5 |
| 4,580,827 | 4/1986 | Feagan | 296/37.6 |
| 4,585,263 | 4/1986 | Hesner | 296/15 |
| 4,635,992 | 1/1987 | Hamilton et al. | 296/37.6 |

Primary Examiner—Johnny D. Cherry
Assistant Examiner—Carol L. Olson

[57] ABSTRACT

A foldaway tool box for a truck bed is provided and consists of a lid and front wall hinged between side walls and rear wall of the truck bed that folds down completely for full use of the truck bed which eliminates the need for removing the tool box. In a modification the tool box is adjustable in size for holding various amounts of tools therein.

7 Claims, 1 Drawing Sheet

U.S. Patent
Jun. 14, 1988
4,750,773
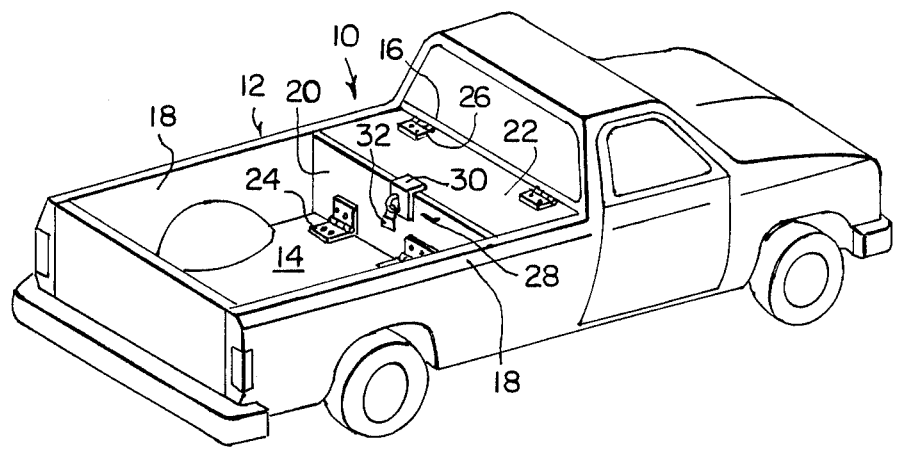
Fig. 1
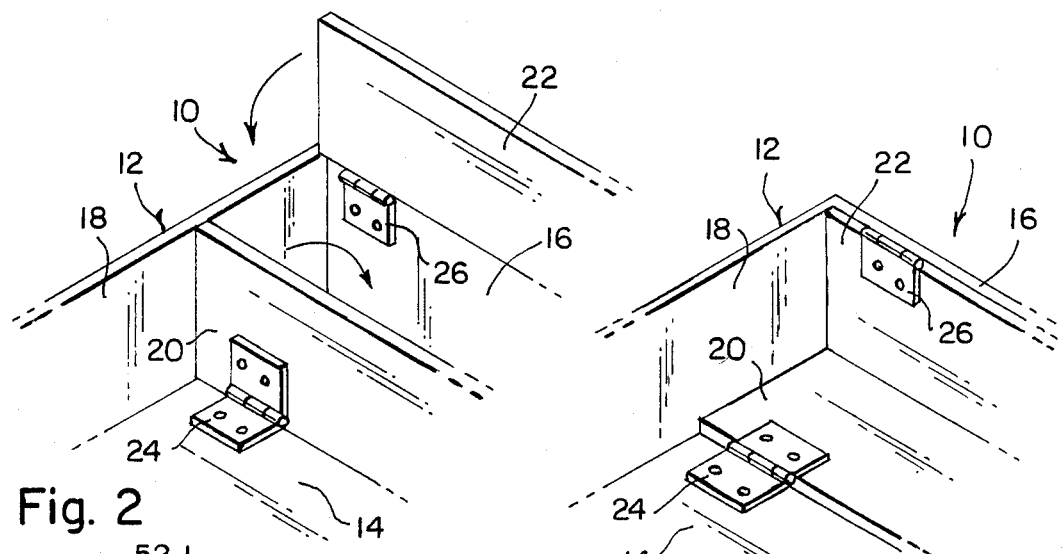
Fig. 2
Fig. 3
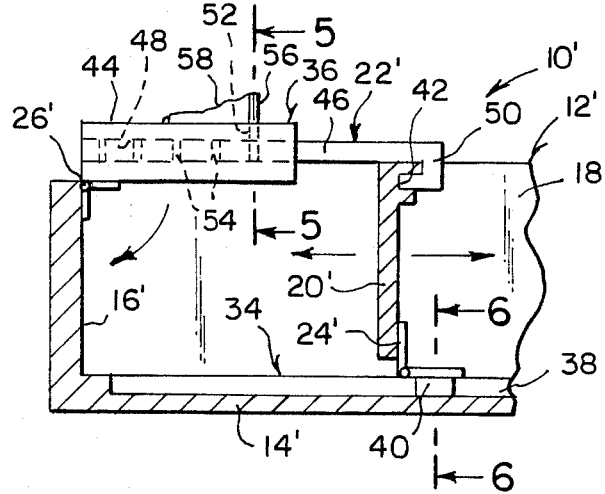
Fig. 4
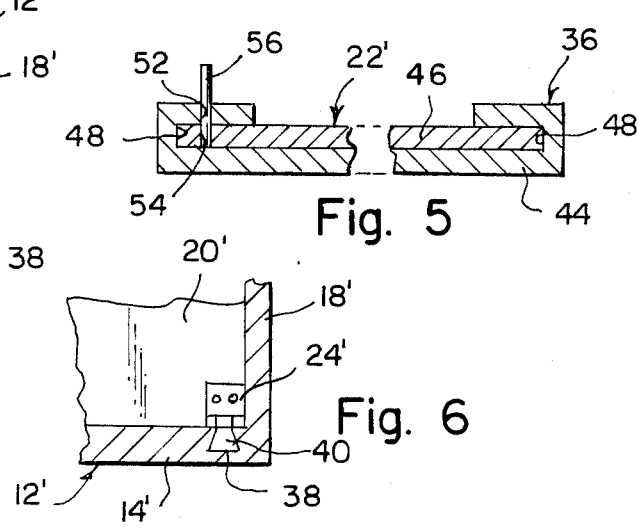
Fig. 5
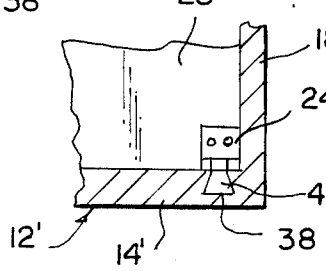
Fig. 6

FOLDAWAY BOX OR CABINET

BACKGROUND OF THE INVENTION

The instant invention relates generally to storage receptacles and more specifically it relates to a foldaway tool box for a truck bed.

Numerous storage receptacles have been provided in prior art that are adapted to be built into the beds of pickup trucks for holding tools and the like. For example, U.S. Pat. Nos. 4,451,075; 4,506,870 and 4,522,326 all are illustrative of such prior art. While these units may be suitable for the particular purpose to which they address, they would not be as suitable for the purposes of the present invention as heretofore described.

SUMMARY OF THE INVENTION

A primary object of the present invention is to provide a foldaway tool box for a truck bed that will overcome the shortcomings of the prior art devices.

Another object is to provide a foldaway tool box for a truck bed that folds down completely for full use of the truck bed which eliminates the need of removing the tool box for different sized cargos.

An additional object is to provide a foldaway tool box for a truck bed that includes a lid and front wall which in a modification can be adjustable to change size of the tool box for holding various amounts of tools therein.

A further object is to provide a foldaway tool box for a truck bed that is simple and easy to use.

A still further object is to provide a foldaway tool box for a truck bed that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention installed in a pickup truck bed.

FIG. 2 is a perspective view with parts removed of the invention in an open position.

FIG. 3 is a perspective view similar to FIG. 2 in a folded down stored position.

FIG. 4 is a side view partly in cross section of a modification being an adjustable tool box.

FIG. 5 is a cross sectional view taken along line 5—5 in FIG. 4 showing the sliding top wall in greater detail.

FIG. 6 is a cross sectional view taken along line 6—6 in FIG. 4 showing the track therein.

DETAILED DESCRIPTION OF THE PREFERRED EMBODIMENTS

Turning now descriptively to the drawings, in which similar reference characters denote similar elements throughout the several views, FIGS. 1, 2 and 3 illustrate a foldaway tool box 10 for a truck bed 12 that has a substantially horizontal floor 14, a substantially vertical rear wall 16 and substantially vertical side walls 18. The tool box 10 consists of a first panel section 20 and a second panel section 22.

The first panel section 20 is hinged at 24 to the floor 14 near the rear wall 16, the first panel section is adapted to assume a horizontal position on the floor 14 for storage and a vertical position whereby the first panel section 20 forms a front closure member for the tool box 10 whose sides are formed by the side walls 18 of the truck bed 12.

The second panel section 22 is hinged at 26 near top of the rear wall 16. The second panel section is adapted to assume a vertical position against the rear wall 16 for storage and a horizontal position whereby the second panel section 22 forms a lid member for the tool box 10.

The foldaway tool box 10 further comprises a device 28 for releasably locking the second panel section 22 in a closed position against the first panel section 20. The device 28 includes a clasp 30 and lock 32.

FIGS. 4, 5 and 6 shows a modified tool box 10' containing a structure 34 for slideably supporting the first panel section 20' on the floor 14' of the truck bed 12'. Another structure 36 is for adjusting size of the second panel section 22' away from the rear wall 16' of the truck bed 12' so as to change relative cacacity of the tool box 10'.

The slideably supporting structure 34 includes the floor 14] of the turck bed 12' having at least one track 38 running parallel between the side walls 18'. The first panel section 20' has at least one slide member 40 extending down from hinge 24' to ride within the at least one track 38. A recess 42 is formed in front surface remote from the hinge 24'.

The adjusting structure 36 includes a rear segment 44 and a front segment 46. The rear segment 44 has a slot 48 therein. The rear segment 44 is hinged at 26' near top of the rear wall 16'. The front segment 46 has a hooked end 50. The front segment is slideable within the slot 48 in the rear segment 44 so that the hooked end 50 can engage with the recess 42 in the first panel section 20'.

The rear segment 44 has a transverse hole 52 extending into the slot 48. The front segment 46 has a plurality of spaced apart transverse holes 54 whereby when the front segment 46 slides within the slot 48, any one of the holes 54 will align with the hole 52 in the rear segment 44. A peg 56 is provided to fit through the hole 52 in the rear segment 44 and one of the holes 54 in the front segment 46 to lock the second panel section 22' in any desired length. A cord 58 attaches free end of the peg 56 to the rear segment 44 preventing loss of the peg 56.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A foldaway tool box for a truck bed having a substantially horizontal floor, a substantially vertical rear wall and substantially vertical side walls, said tool box comprising:

(a) a first panel section hinged to said floor near said rear wall being adapted to assume a horizontal position on said floor for storage and a vertical position whereby said first panel section forms a front closure member for said tool box whose sides are formed by said side walls of said truck bed; and (b) a second panel section hinged near top of said rear wall being adapted to assume a vertical position against said rear wall for storage and a horizontal position whereby said second panel section forms a lid member for said tool box.

2. A foldaway tool box as recited in claim 1, further comprising means for releasably locking said second panel section in a closed position against said first panel section.

3. A foldaway tool box as recited in claim 2, whereby said releasably locking means includes a clasp and lock.

4. A foldaway tool box as recited in claim 1, further comprising:
   (a) means for slideably supporting said first panel section on said floor of said truck bed; and
   (b) means for adjusting size of said second panel section in a direction away from said rear wall of said truck bed so as to change relative capacity of said tool box.

5. A foldaway tool box as recited in claim 4, wherein said slideably supporting means includes:
   (a) said floor of said truck bed having at least one track running parallel between said side walls; and
   (b) said first panel section having at least one slide member extending down from said hinge to ride within said at least one track and a recess formed in a front panel surface remote from said hinge.

6. A foldaway tool box as recited in claim 5, wherein said adjusting means includes:
   (a) a rear segment having a slot therein, said rear segment hinged near top of said rear wall; and
   (b) a front segment having a hooked end, said front segment slideable within said slot in said rear segment so that said hooked end can engage with said recess in said first panel section.

7. A foldaway tool box as recited in claim 6, further comprising:
   (a) said rear segment having a transverse hole extending into said slot;
   (b) said front segment having a plurality of spaced apart transverse holes whereby when said front segment slides within said slot, any one of said holes will align with said hole in said rear segment;
   (c) a peg to fit through said hole in said rear segment and one of said holes in said front segment to lock said second panel seciton in any desired length; and
   (d) a cord attaching free end of said peg to said rear segment preventing loss of said peg.

* * * * *